United States Patent
Liu et al.

(10) Patent No.: US 6,778,338 B2
(45) Date of Patent: Aug. 17, 2004

(54) SHIELD ASSEMBLY FOR A BUILT-IN LENS SET

(75) Inventors: Chia-Yu Liu, Taoyuan Hsien (TW); Chang-Chein Li, Hsin Chuan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/379,667

(22) Filed: Mar. 6, 2003

(65) Prior Publication Data

US 2003/0169511 A1 Sep. 11, 2003

(30) Foreign Application Priority Data

Mar. 8, 2002 (TW) .................................. 91202795 U

(51) Int. Cl.⁷ .......................... G02B 7/02; G03B 11/04; G03B 21/14
(52) U.S. Cl. .................... 359/808; 359/818; 359/511; 359/513; 353/119
(58) Field of Search ................................ 359/507, 511, 359/513, 808, 818; 353/119

(56) References Cited

U.S. PATENT DOCUMENTS 6,619,806 B2 * 9/2003 Akami et al. ............... 359/513

* cited by examiner

Primary Examiner—David N. Spector
(74) Attorney, Agent, or Firm—Troxell Law Office PLLC

(57) ABSTRACT

A shield assembly for a built-in lens set is introduced to a lens set built in a housing, in which the lens set has an optical head and the housing provides an aperture with respective to the optical head. A protrusive enclosure surrounding the aperture protrudes toward the optical head and is spaced from the optical head by a variable slim spacing. The shield assembly includes a shield ring for sleeving both the optical head and the protrusive enclosure and an elastic connecting unit for bridging the shield ring and the housing. By providing the shield ring to enclose always the spacing and the elastic connecting unit to engage elastically the lens set with the housing, the lens set can be prevented from dust-contaminating through the aperture, aged axial offsetting problem, and poor focus-adjusting performance caused by backlash existing in a driving mechanism.

11 Claims, 5 Drawing Sheets

SHIELD ASSEMBLY FOR A BUILT-IN LENS SET

FIELD OF THE PRESENT INVENTION

The present invention relates to a shield assembly for a built-in lens set, and more particularly to a shield assembly that has a shield ring and elastic elements to couple the lens set with a housing for preventing light interference, reducing dust contamination, and enhancing positioning and supporting of the lens set.

BACKGROUND OF THE PRESENT INVENTION

Nowadays, a wide variety of image projecting or capturing devices are available on the market. Among them, there is one type that has a built-in lens set. The image projecting or capturing device that has a built-in lens set generally includes a housing to form the device body. Then, various elements can be built in the housing; including a lens set, an image unit, a power supply unit, a control unit and so on. Typically, the housing has an aperture corresponding to the inside lens set for optical images to be input or output.

Refer to FIGS. 1 and 2 for the relationship of the housing and the lens set of a conventional image projecting or capturing device. The lens set 2 as shown includes an optical head 21 that has an outer rim 210. The housing 1 has an aperture 11 corresponding to the optical head 21 for inputting or outputting of optical images. The aperture 11 is formed on an inner rim 10 of the housing 1 and can have a protrusive enclosure 110 extending towards the optical head 21 of the lens set 2 for a preset distance.

As shown in FIGS. 1 and 2, the protrusive enclosure 110 can shorten the spacing between the optical head 21 of the lens set 2 and the aperture 11, and thus can reduce possible light interference upon the lens set or dusts contamination inside the device body. However, to meet the requirements of assembly allowance and focusing adjustment of the lens set 2 (through a focusing ring 22 or other control elements), there is always a gap $\delta$ between the optical head 21 of the lens set 2 and a front edge 111 of the protrusive enclosure 110. The gap $\delta$ is variable for the focus of the lens set 2 can be arbitrarily adjusted.

In the conventional techniques set forth above, the lens set 2 is constructed like a short suspending cantilever beam with its free end close to the housing 1, and with the gap $\delta$ located between the optical head 21 and the front edge 111 of the protrusive enclosure 110. As a result, a number of problems as follows may incur.

1. The gap $\delta$ between the optical head 21 of the lens set 2 and the protrusive enclosure 110 of the housing 1 becomes a pathway for dusts contamination. External dusts can drift into the housing 1 through the gap $\delta$. When dusts accumulate on the device body for a substantial term, elements inside the device will tend to be contaminated. It could even result in wear-off of elements and malfunction of electric systems.

2. The gap $\delta$ between the optical head 21 of the lens set 2 and the enclosure 110 of the housing 1 can be enlarged or shrunk upon adjusting of the focus. When the gap $\delta$ is enlarged, extra light interference will incur and optical signals of image input or output between the lens set 2 and the protrusive enclosure 110 of the housing 1 will be affected to some extent.

3. For a zoom lens set 2, the optical head 21 of the lens set 2 is suspended freely. It is not a secured engaging condition relative to the focus adjustment mechanism of the device body. When utilizing for a long period of time, the backlash between driving gears will tend to increase. As a result, controllability of focus adjustment will suffer.

4. There is no common support or linkage between the housing 1 and the lens set 2. The relative position between the optical head 21 of the lens set 2 and the protrusive enclosure 110 of the housing 1 is prone to be offset under various changing factors such as service time, offsetting of the lens set 2 mounting dock, or deformation of the housing 1, and so on. As a result, optical signals of image input or output between the lens set 2 and the aperture 11 of the housing 1 will incur deviations.

While some of aforesaid problems might be assumed by users as natural consequences resulting from aging of the device, yet, from manufacturers' point of view, there is still a room for improvement.

SUMMARY OF THE PRESENT INVENTION

Accordingly, the primary object of the present invention is to provide a shield assembly for a built-in lens set that has an elastic connecting unit located between the lens set and the housing to restrain light interference, to prevent dust contamination, and to maintain proper alignment between the lens set and the aperture of the housing.

Another object of the present invention is to provide a built-in lens set with improved controllability for operation that has an elastic connecting unit linking to the housing for providing a continuous elastic force to prevent the controllability of the driving mechanism of focus adjustment in the lens set from being affected by the backlash.

The shield assembly for a built-in lens set according to the present invention is located between a housing and a lens set mounted in the housing. The lens set includes an optical head with an outer rim. The housing has an aperture located on a location corresponding to the lens set. A protrusive enclosure is formed on an inner rim of the housing and surrounding the aperture and extending to the lens set for a preset distance. The shield assembly of the present invention includes a shield ring coupling with an exterior periphery of the optical head of the lens set and the protrusive enclosure, and an elastic connecting unit located between the shield ring and the housing.

The shield ring formed as an annular ring surrounding the exterior periphery of the optical head of the lens set and has a connecting end, a movable end corresponding to the connecting end, an outer rim connecting the movable end and the connecting end, and an inner rim corresponding to the outer rim and connecting the movable end and the connecting end. The connecting end is fixedly coupled on the optical head of the lens set, while the movable end is movably coupled with the exterior of the enclosure of the aperture.

The elastic connecting unit provides extensible connecting function between the shield ring and the housing, and includes a first end and a second end. The first end is fixedly mounted to the outer rim of the shield ring and the second end is fixedly mounted to the inner rim of the housing.

In one embodiment of the present invention, the elastic connecting unit consists of a plurality of spring elements. The spring elements are preferably located in an angular and equally spaced manner between the shield ring and the housing.

In one embodiment of the present invention, the elastic connecting unit may include at least one snap hook extending from the first end to the second end, and at least one latch trough extending from the second end to the first end. The snap hook and the latch trough form a movement limitation between the first end and the second end to ensure the lens set and the enclosure forming secured connection and positioning. In a preferred embodiment, the elastic connecting unit includes a plurality of spring elements. Each spring element is coupled with one latch trough and one snap hook.

In another embodiment of the present invention, the pair of the latch trough and the snap hook are formed in an exchanged manner; i.e. the elastic connecting unit includes at least one snap hook extending from the second end to the first end, and at least one latch trough extending from the first end to the second end.

In another embodiment of the present invention, the elastic connecting unit may include a plurality of rubber elements that are preferably located in an angular and equally spaced manner between the shield ring and the housing.

The foregoing, as well as additional objects, features and advantages of the present invention will be more readily apparent from the following detailed description, which proceeds with reference to the accompanying drawings.

DESCRIPTION OF THE PREFERRED EMBODIMENTS

In the following discussions, in order to maintain consistency, elements of same function but located or constructed slightly different will be marked by same numerals.

Figure 1:
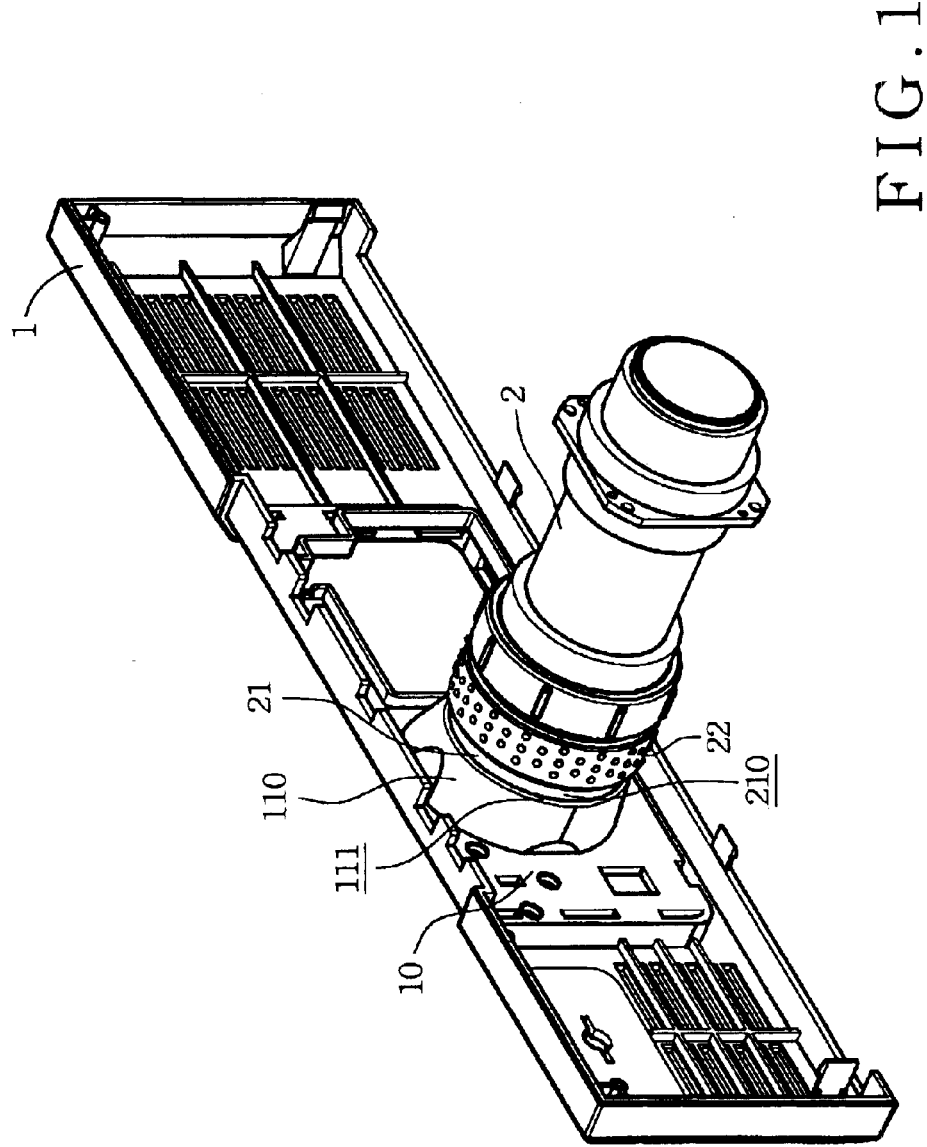
FIG. 1 is a perspective view of a conventional image projecting or capturing device, showing the relationship between the housing and the lens set.
Figure 2:
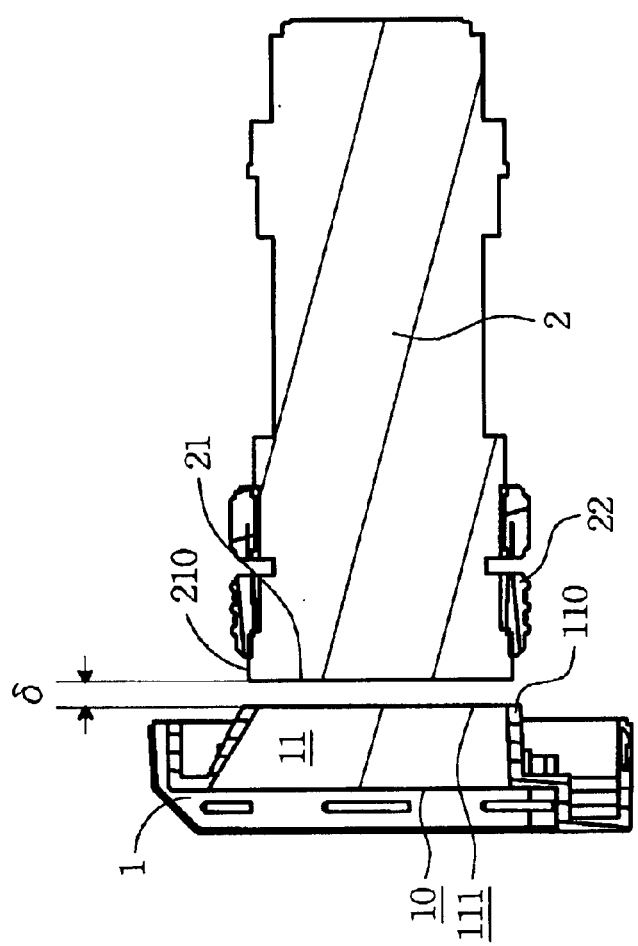
FIG. 2 is a schematic side view according to FIG. 1.
Figure 3:
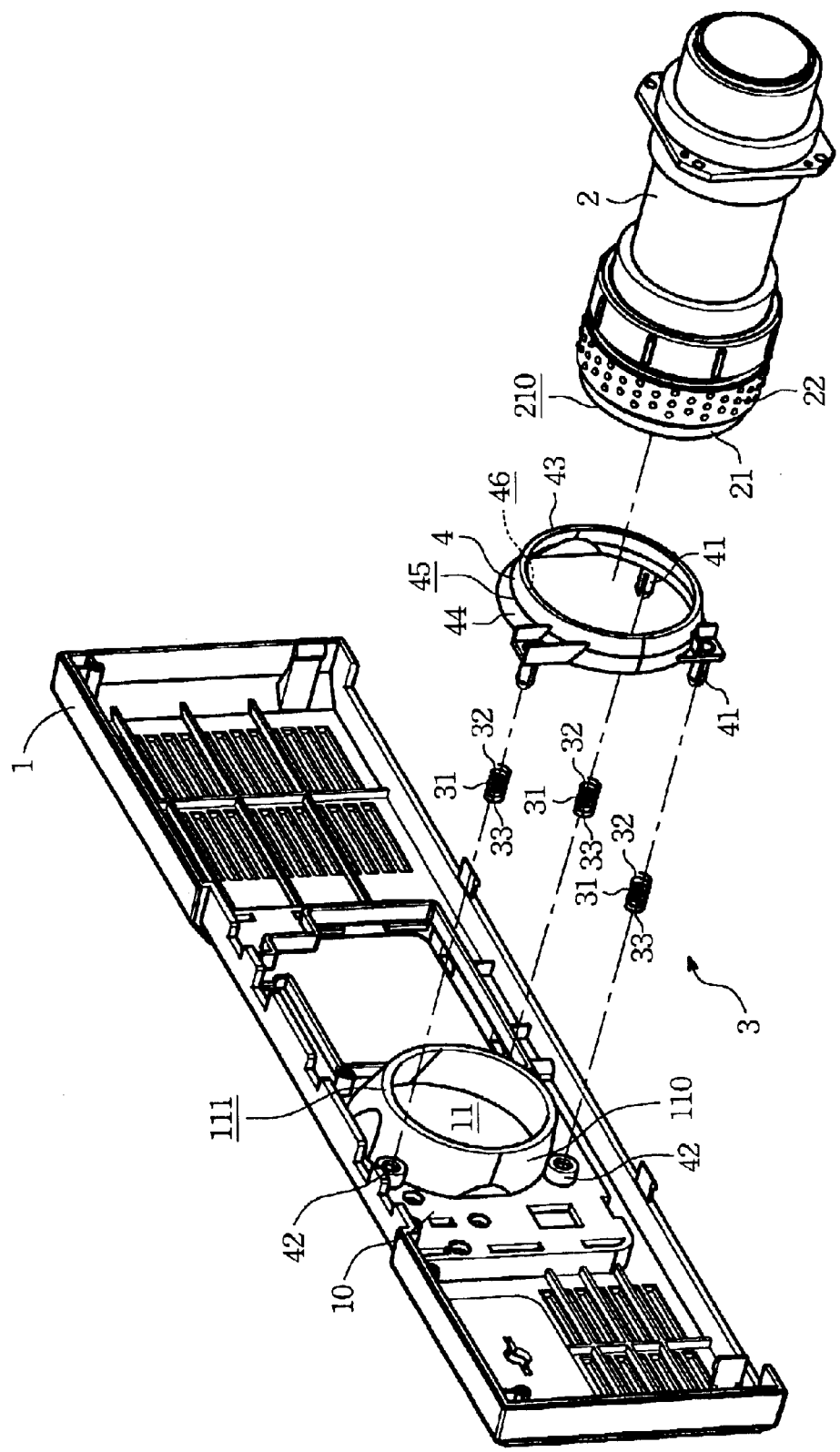
FIG. 3 is an exploded view of an embodiment of a shield assembly for a built-in lens set of the present invention.

Referring to FIG. 3, the shield assembly for a built-in lens set according to the present invention is located between a housing 1 and a lens set 2 mounting in the housing 1. The lens set 2 includes an optical head 21 that has an outer rim 210. The housing 1 has an aperture 11 formed on a location corresponding to the optical head 21. A protrusive enclosure 110 is formed on an inner rim 10 of the housing 1 and surrounding the aperture 11 and extended towards the optical head 21 of the lens set 2 for a preset distance. As shown in the drawing, the shield assembly of the present invention may include a shield ring 4 coupling with an outer periphery of the optical head 21 of the lens set 2 and the protrusive enclosure 110 (on the surface of the protrusive enclosure 110 marked in the drawing), and an elastic connecting unit 3 located between the shield ring 4 and the housing 1.

The shield ring 4 is an annular ring surrounding the outer periphery of the optical head 21 of the lens set 2 and the protrusive enclosure 110, and includes a connecting end 43, a movable end 44 corresponding to the connecting end 43, an outer rim 45 connecting the movable end 44 and the connecting end 43, and an inner rim 46 corresponding to the outer rim 45 and connecting the movable end 44 and the connecting end 43. The connecting end 43 is fixedly coupled with the optical head 21 of the lens set 2 (may be connected to the optical head 21 through the inner rim 46). The movable end 44 is movably coupled with the protrusive enclosure 110 of the aperture 11.

The elastic connecting unit 3 provides extensible connecting function between the shield ring 4 and the housing 1, and includes a first end 32 and a second end 33. The first end 32 may be fixedly mounted to the outer rim 45 of the shield ring 4, while the second end 33 may be fixedly mounted to the inner rim 10 of the housing 1.

In this embodiment, the elastic connecting unit 3 consists of a plurality of spring elements 31, snap hooks 41 and latch troughs 42 corresponding to the snap hooks 41 (three sets are shown in the drawing). The spring elements 31 are located in an angular and equally spaced manner between the shield ring 4 and the housing 1 to balance the forces of the elastic connecting unit 3 exerting on the shield ring 4 and the housing 1.

As shown in the drawing, the snap hook 41 (mounted to the shield ring 4) is extended from the first end 32 to the second end 33. The latch trough 42 (located on the inner rim 10 of the housing 1) is extended from the second end 33 to the first end 32. The latch trough 42 and the snap hook 41 form a movement limitation for the elastic connecting unit 3 between the first end 32 and the second end 33 to ensure the lens set 2 and the protrusive enclosure 110 forming secured connection and positioning.

Figure 4A:
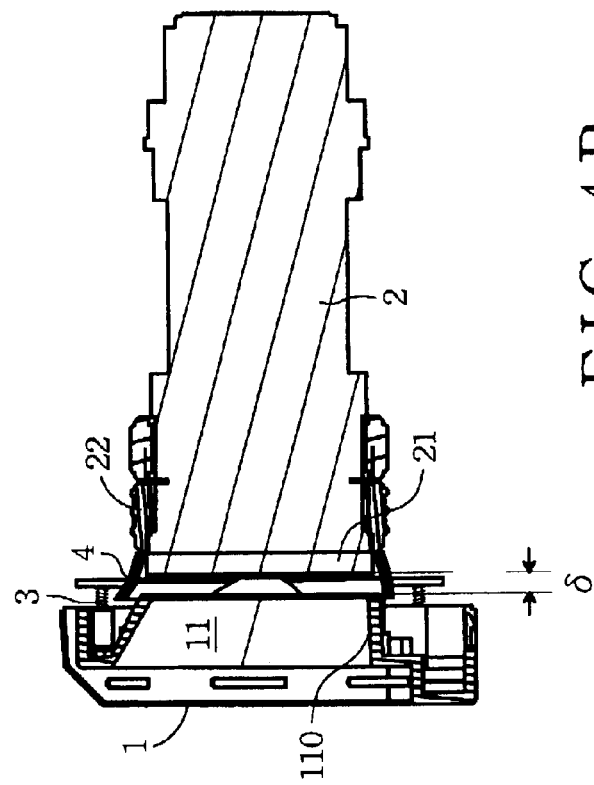
FIG. 4A is a schematic side view according to FIG. 3 in an assembled state.
Figure 4B:
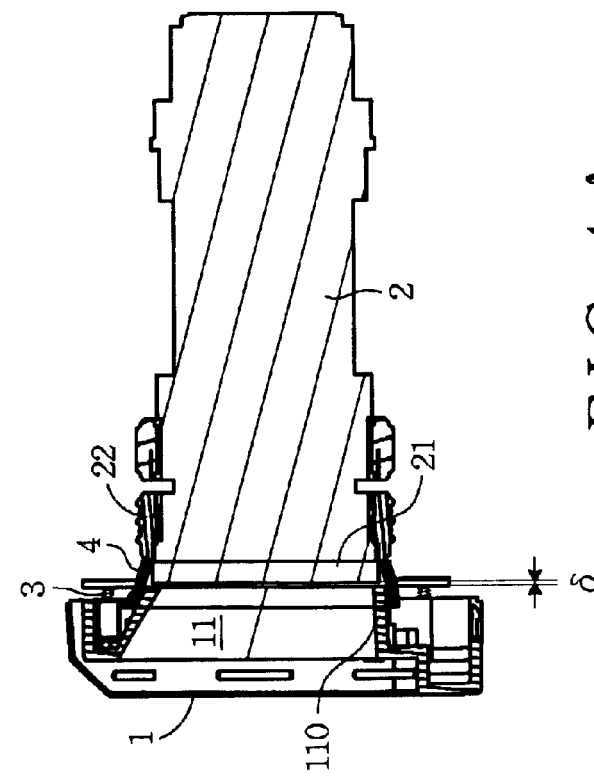
FIG. 4B is another schematic side view according to FIG. 3 in the assembled state with a gap δ larger than the one shown in FIG. 4A.

Refer to FIGS. 4A and 4B for operations of the present invention according to the embodiment shown in FIG. 3. The shield ring 4 and the protrusive enclosure 110 maintain an overlap by at least a selected length that is within the focus length changing range of the lens set 2. Thereby, the shield ring 4 can absorb unnecessary images generated by the projecting lens set 2 and effectively constrain incurring of light interference resulting from image projection of the lens set 2. It also can prevent dusts from entering into the housing 1 through the aperture 11. The elastic connecting unit 3 further provides elastic connection and support between the lens set 2 and the housing 1 so as to effectively resolve the backlash and alignment offsetting problems that incur to conventional structures mentioned above.

In the embodiment shown in FIG. 3, the elastic connecting unit 3 consists of a plurality of spring elements 31 and pairs of the matching latch troughs 42 and the snap hooks 41. In other embodiments (not shown in the drawing), the spring elements and the pairs of the latch troughs and the snap hooks may be set up separately to respectively perform elastic and movement limitation functions. Of course, there are other embodiments in which the numbers of the spring elements and the pairs of the latch troughs and the snap hooks may be more than one but with unequal numbers (such as five spring elements and two pairs of latch troughs and the snap hooks). Numerous embodiment alterations may be adopted with equal effect by those skilled in the art. Thus, they are omitted herein.

Figure 5:
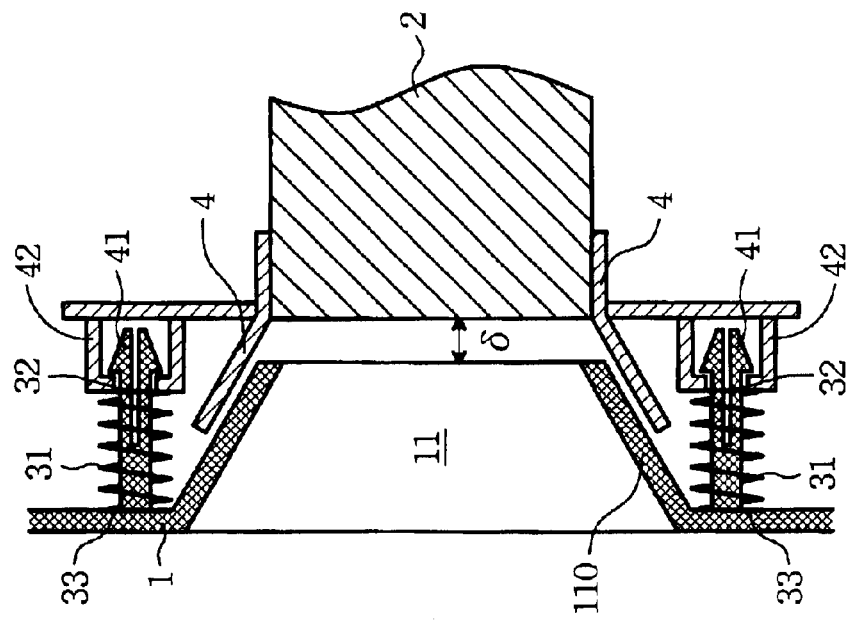
FIG. 5 is a fragmentary sectional view of another embodiment of the present invention.

Refer to FIG. 5 for another embodiment of the present invention. The formation of the latch troughs 42 and the snap hooks 41 are substantially the same as that shown in FIG. 3, but their mounting locations are exchanged. That is, the elastic connecting unit includes at least one snap hook 41 extending from the second end 33 to the first end 32, at least one latch trough 42 extending from the first end 32 to the second end 33, and matching spring elements 31 located between the snap hook 41 and the latch trough 42. Applications and operations of this embodiment are substantially the same as those shown in FIG. 3. Thus, details are omitted herein.

Figure 6:
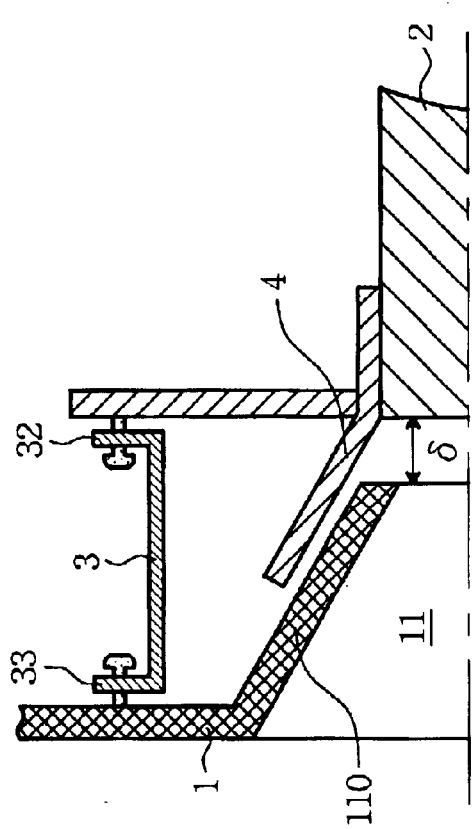
FIG. 6 is a fragmentary sectional view of yet another embodiment of the present invention.

Referring to FIG. 6 for yet another embodiment of the present invention. The elastic connecting unit 3 consists of a plurality of rubber elements fixedly located between the lens set 2 and the housing 1. Similarly, the elastic connecting unit 3 is preferably mounted between the shield ring 4 and the housing 1 in an angular and equally spaced manner.

In the present invention, there are many approaches available for implementing the elastic connecting unit, including elastic elements (such as springs, rubbers, or the likes), or coupling with movement limitation means of the snap hooks and the latch troughs. All those possible embodiments are variations or equivalents of the embodiments of the present invention disclosed above, and are within the scope of the present invention, and may occur to those skilled in the art. However, details are omitted herein.

The shield assembly for a built-in lens set of the present invention, through the elastic connecting unit located between the lens set and the housing, provides overlap relationship between the shield ring and the protrusive enclosure, prevents dusts from entering into the housing, improves lens alignment, and also provides continuous elastic force to give the driving mechanism for focus change in the lens set a continuous elastic loading so as to eliminate the impact of backlash to the controllability.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A shield assembly for a built-in lens set, located in a housing with the lens set consisting of an optical head with an outer rim, the housing having an aperture corresponding to the optical head and an inner rim extending to form a protrusive enclosure of the aperture, the shield assembly comprising:

a shield ring, formed in an annular ring surrounding outer peripheral areas of the optical head and the protrusive enclosure, further including a connecting end, a movable end corresponding to the connecting end, and an outer rim connecting the movable end and the connecting end, the connecting end being fixedly coupled with the optical head, the movable end being movably coupled with the protrusive enclosure; and an elastic connecting unit for providing extensible connecting function between the shield ring and the housing, further including a first end and a second end, the first end being fixedly mounted to the outer rim of the shield ring, the second end being fixedly mounted to the inner rim of the housing.

2. The shield assembly for a built-in lens set of claim 1, wherein said elastic connecting element consists of a plurality of spring elements.

3. The shield assembly for a built-in lens set of claim 2, wherein said spring elements are located between said shield ring and said housing in an angular and equally spaced manner.

4. The shield assembly for a built-in lens set of claim 2 further include at least one snap hook extending from said first end to said second end, and at least one latch trough extending from said second end to said first end and corresponding to the snap hook, the latch trough and the snap hook forming a movement limitation between said first end and said second end.

5. The shield assembly for a built-in lens set of claim 4, wherein each of said spring elements is coupled with one said latch trough and one said snap hook.

6. The shield assembly for a built-in lens set of claim 2 further includes at least one latch trough extending from said first end to said second end, and at least one snap hook extending from said second end to said first end and corresponding to the latch trough, the latch trough and the snap hook forming a movement limitation between said first end and said second end.

7. The shield assembly for a built-in lens set of claim 6, wherein each of said spring elements is coupled with one said latch trough and one said snap hook.

8. The shield assembly for a built-in lens set of claim 1, wherein said elastic connecting unit consists of a plurality of rubber elements.

9. The shield assembly for a built-in lens set of claim 8, wherein said rubber elements are located between said shield ring and said housing in an angular and equally spaced manner.

10. The shield assembly for a built-in lens set of claim 8 further includes at least one snap hook extending from said first end to said second end, and at least one latch trough extending from said second end to said first end and corresponding to the snap hook, the latch trough and the snap hook forming a movement limitation between said first end and said second end.

11. The shield assembly for a built-in lens set of claim 8 further includes at least one latch trough extending from said first end to said second end, and at least one snap hook extending from said second end to said first end and corresponding to the latch trough, the latch trough and the snap hook forming a movement limitation between said first end and said second end.

* * * * *